UNITED STATES PATENT OFFICE.

RICHARD PAUL, OF BERLIN, GERMANY.

PROCESS OF MANUFACTURING BAKING-POWDER.

No. 913,762.

Specification of Letters Patent.

Patented March 2, 1909.

Application filed March 6, 1906. Serial No. 304,454.

*To all whom it may concern:*

Be it known that I, RICHARD PAUL, doctor of philosophy, chemist, a subject of the King of Prussia, German Emperor, residing at 10 Friedrich-Wilhelmstrasse, Berlin, Kingdom of Prussia, German Empire, have invented new and useful Improvements in Process of Manufacturing Baking-Powder, of which the following is a specification.

This invention relates to the process of manufacturing baking powder, in which the evolution of carbonic acid, in mixing the powder with flour, cereals, etc., and water, and during the baking process is caused by means of the action of tartaric acid on bicarbonates of alkalies.

The object of the process is to manufacture a baking powder that evolves carbonic acid slowly enough to allow a sufficient rising of the dough, without a too quick collapsing.

In accordance with my new process, tartaric acid is beaten with a solution or emulsion of albumen or its equivalent, and then dried. The thus prepared tartaric acid is then mixed with bicarbonate of sodium and sugar.

The process may be carried out in the following manner, which I state as one mode, and the best now known to me, of carrying out my invention:—20 parts of dry white of egg are dissolved in 80 parts of water, while warming preferably to a temperature below the coagulating temperature (about 40 degrees centigrade) The solution is mixed with 276 parts c finely powdered tartaric acid, during a moderate heating, until the whole mass has the consistency of a tough froth. The froth is then dried, preferably at a temperature not exceeding 40 degrees centigrade. The dried mass is then mixed with 420 parts of sugar and is finely triturated. Then 310 parts of bicarbonate of sodium are added, and the whole mass is again triturated and if desired sifted, in order to obtain a converted mixture. Instead of sugar, milk sugar or flour may be used if preferred. In using flour, I prefer to add to the flour the undried wet mixture of tartaric acid and white of egg, after which the drying operation may be effected. Milk sugar may be preferred to sugar if a baking powder especially suitable for sick persons is desired. The use of flour is preferable if it is desired to produce a baking powder which can be used for preparing cakes, etc., without additions of flour. One can also use mixtures of sugar (or milk r) and flour.

It is necessary that the tartaric acid be so mixed with the albumen that such a compound will be obtained that the subsequent action of the tartaric acid on the bicarbonate of sodium is retarded but not completely prevented. The tartaric acid is surrounded by a layer of albumen. The said coating is, however, so thin that the reaction between tartaric acid and bicarbonate of sodium is not prevented when moistened.

It is not required to dry the tartaric acid before mixing it with the albumen, one can also use the tartaric acid in a wet state as coming from the manufactories.

The proportions of the sugar or flour can be chosen according to the special purposes.

If the albumen is beaten to froth, the tartaric acid is coated with a thin layer of albumen. This coating is obtained at all points where the particles of the tartaric acid meet with the walls of the froth particles. In the drying operation this coating cannot be destroyed, because it is supported by the solid particles of the tartaric acid. For the present process only the maintenance of the said coatings is of importance, whereas a destroying of the other frothy particles, which should be unsupported, is irrelevant. It is, however, clear that the coating may be maintained by any method of drying.

What I claim as my invention and desire to secure by Letters Patent is:—

1. The process of manufacturing baking powder which consists in mixing tartaric acid with froth forming albumen, beating the mixture to froth, drying the mixture beaten to froth and mixing it with bicarbonate of sodium.

2. The process of manufacturing baking powder which consists in mixing tartaric acid with froth forming albumen, beating the mixture to froth, drying the mixture beaten to froth and mixing it with bicarbonate of sodium and sugar.

3. The process of manufacturing baking powder which consists in mixing tartaric acid with froth forming white of egg, beating the mixture to froth, drying the mixture, beaten to froth, at temperatures below the coagulation temperature of white of egg and mixing it with bicarbonate of sodium.

In testimony whereof I have signed my name to this specification in the presence of two subscribing witnesses.

RICHARD PAUL.

Witnesses:
  HENRY HASPER,
  WOLDEMAR HAUPT.